United States Patent
Bridgeford

(10) Patent No.: US 11,748,722 B2
(45) Date of Patent: Sep. 5, 2023

(54) METHOD FOR ONLINE ORDERING USING CONVERSATIONAL INTERFACE

(71) Applicant: Wizard Commerce, Inc., New York, NY (US)

(72) Inventor: Melissa Bridgeford, St. Petersburg, FL (US)

(73) Assignee: WIZARD COMMERCE, INC., New York, NY (US)

( * ) Notice: Subject to any disclaimer, the term of this patent is extended or adjusted under 35 U.S.C. 154(b) by 0 days.

(21) Appl. No.: 17/236,047

(22) Filed: Apr. 21, 2021

(65) Prior Publication Data

US 2021/0366028 A1 Nov. 25, 2021

Related U.S. Application Data

(63) Continuation-in-part of application No. 16/227,590, filed on Dec. 20, 2018, now abandoned.
(Continued)

(51) Int. Cl.
*G06Q 30/00* (2023.01)
*G06Q 20/12* (2012.01)
(Continued)

(52) U.S. Cl.
CPC ............. *G06Q 20/12* (2013.01); *G06F 3/167* (2013.01); *G06F 18/2431* (2023.01); *G06N 5/02* (2013.01);
(Continued)

(58) Field of Classification Search
CPC .... G06Q 20/12; G06Q 30/0641; G06Q 30/04; G06F 3/167; G06F 18/2431; G06N 5/02;
(Continued)

(56) References Cited

U.S. PATENT DOCUMENTS

| | | | |
|---|---|---|---|
| 2012/0016678 A1* | 1/2012 | Gruber | G10L 13/08 704/E21.001 |
| 2014/0080428 A1* | 3/2014 | Rhoads | G06F 16/5838 455/88 |

OTHER PUBLICATIONS

M. Nuruzzaman and O. K. Hussain, "A Survey on Chatbot Implementation in Customer Service Industry through Deep Neural Networks," 2018 IEEE 15th International Conference on e-Business Engineering (ICEBE), 2018, pp. 54-61, doi: 10.1109/ICEBE.2018. 00019. (Year: 2018).*

* cited by examiner

*Primary Examiner* — Anand Loharikar
(74) *Attorney, Agent, or Firm* — Fenwick & West LLP

(57) ABSTRACT

Embodiments of the invention provide a method, system and computer program product for online ordering using conversational interfaces. In an embodiment of the invention, the method includes storing customer information corresponding to a customer and responsive to receiving a message with text or speech and an image from the customer, identifying an intent type from the text or speech using Natural Language Understanding, identifying a product or service from the image using image classification techniques and transmitting a product detail message to the customer with the product or service and corresponding pricing using Natural Language Generation. The method further includes responsive to receiving an affirmative message from the customer in response to the product detail message identified as affirmative using Natural Language Understanding, automatically completing a purchase of the product or service with the customer information and transmitting a receipt message to the customer with an order receipt.

18 Claims, 1 Drawing Sheet

Related U.S. Application Data

(60) Provisional application No. 62/608,088, filed on Dec. 20, 2017.

(51) Int. Cl.
*G06Q 30/0601* (2023.01)
*G06Q 30/04* (2012.01)
*G06F 3/16* (2006.01)
*G06N 5/02* (2023.01)
*G06F 18/2431* (2023.01)
*G06V 10/75* (2022.01)
*G06V 10/80* (2022.01)
*G06V 10/82* (2022.01)
*G06V 40/16* (2022.01)

(52) U.S. Cl.
CPC ......... *G06Q 30/04* (2013.01); *G06Q 30/0641* (2013.01); *G06V 10/75* (2022.01); *G06V 10/811* (2022.01); *G06V 10/82* (2022.01); *G06V 40/172* (2022.01)

(58) Field of Classification Search
CPC ...... G06V 10/75; G06V 10/811; G06V 10/82; G06V 40/172
USPC ................................ 705/26.1–27.2
See application file for complete search history.

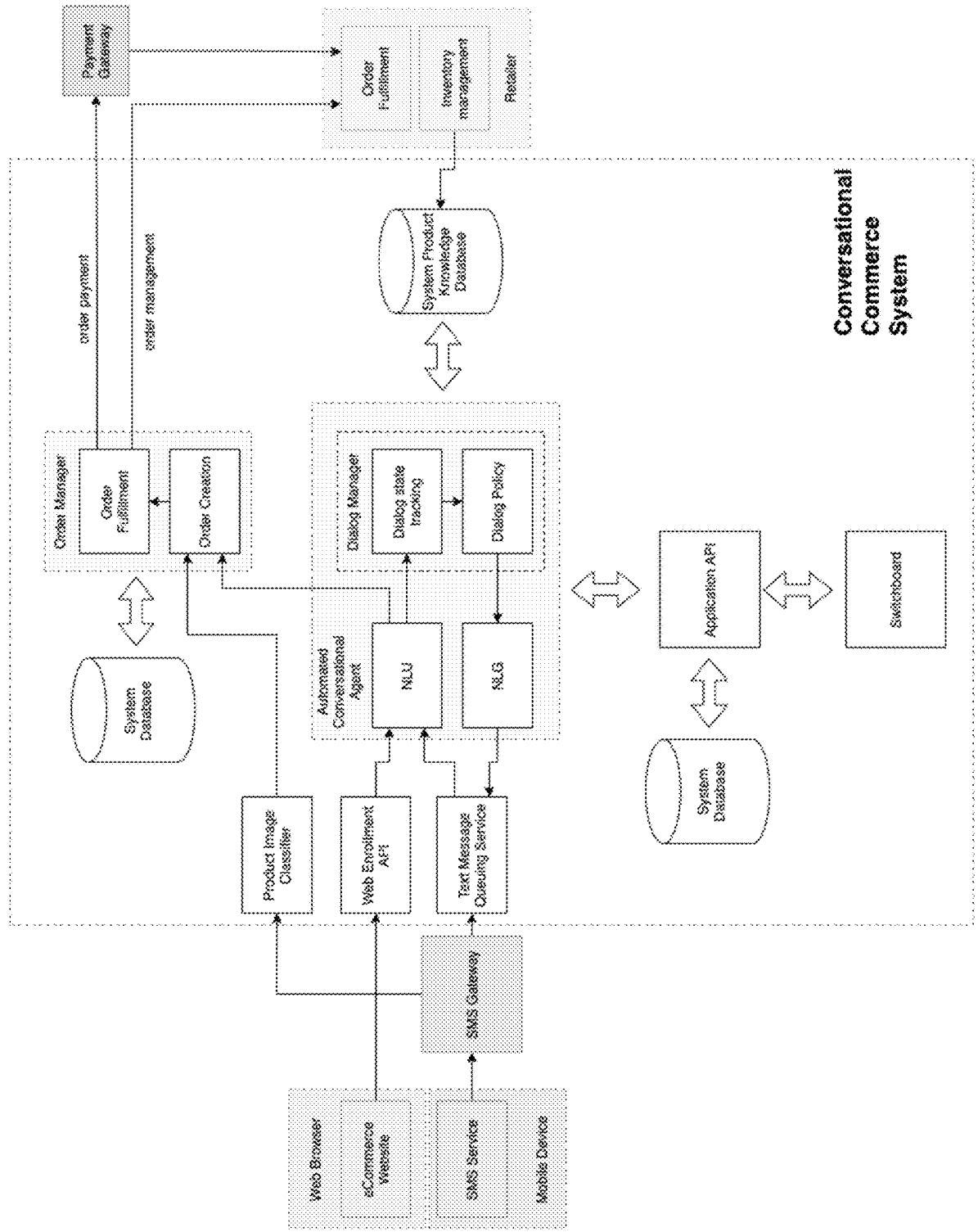

METHOD FOR ONLINE ORDERING USING CONVERSATIONAL INTERFACE

CROSS-REFERENCE TO RELATED APPLICATIONS

This application is a continuation-in-part of U.S. patent application Ser. No. 16/227,590, filed Dec. 20, 2018, which claims priority to U.S. Provisional Patent Application No. 62/608,088, filed Dec. 20, 2017, the entireties of which are incorporated herein by reference.

BACKGROUND OF THE INVENTION

Field of the Invention

The present invention relates to online transactions and more particularly to online transactions completed using messages.

Description of the Related Art

Conventionally, a user may purchase goods and services via web-based e-commerce. Typically, the user searches for and then selects the items they wish to purchase, places them in a virtual shopping cart, and then completes the checkout process to purchase the item and complete the transaction. During the checkout process, the user must provide personal information (such as name, email address, and mobile phone number), delivery address, payment information, billing address and typically create an account. As a result, the checkout process is full of friction for buyers, in that it requires so much information and time to complete, that buyers often abandon the process before completing the purchase. On mobile phones, the checkout process is even more cumbersome given the small screen size which requires more time to complete the small fields and inherently, mobile phone users are on the go resulting in less time to complete any one transaction.

SUMMARY OF THE INVENTION

Embodiments of the present invention address deficiencies of the art in respect to completing online transactions and provide a novel and non-obvious method, system and computer program product for online ordering using conversational interfaces.

In an embodiment of the invention, the method includes storing customer information corresponding to a customer and responsive to receiving a message with text or speech and an image from the customer, identifying an intent type from the text or speech using Natural Language Understanding, identifying a product or service from the image using image classification techniques and transmitting a product detail message to the customer with the product or service and corresponding pricing using Natural Language Generation. The method further includes responsive to receiving an affirmative message from the customer in response to the product detail message identified as affirmative using Natural Language Understanding, automatically completing a purchase of the product or service with the customer information and transmitting a receipt message to the customer with an order receipt.

In one aspect of the embodiment, the message is received through text message. In another aspect of the embodiment, the customer information includes a phone number, payment information and shipping information. In another aspect of the embodiment, the intent type identified by the Natural Language Understanding include an intent to order specific products, an intent to inquire about product details, and an intent to ask for product recommendations, and wherein the product detail message using Natural Language Generation corresponds to the intent type. In another aspect of the embodiment, the product details using image classification techniques are identified using a system product knowledge database. In another aspect of the embodiment, the system product knowledge database is stored as a knowledge graph.

In another embodiment of the invention, a data processing system is configured for online ordering using a conversational interface. The system includes a host computing system with one or more computers each with memory and at least one processor, an application executing in memory of the host computing system and a module coupled to the application. The module including program code enabled to store customer information corresponding to a customer and to respond to receiving a message with text or speech and an image from the customer by identifying an intent type from the text or speech using Natural Language Understanding, identifying a product or service from the image using image classification techniques, transmitting a product detail message to the customer with the product or service and corresponding pricing using Natural Language Generation, and to respond to receiving an affirmative message from the customer in response to the product detail message identified as affirmative using Natural Language Understanding by automatically completing a purchase of the product or service with the customer information and transmitting a receipt message to the customer with an order receipt.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE ATTACHMENTS/FIGURES

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic illustration of a data processing system configured for online ordering using conversational interface in accordance with embodiments of the present disclosure.

DETAILED DESCRIPTION OF THE PREFERRED EMBODIMENT

Embodiments of the invention provide for online ordering using conversational interface. In accordance with an embodiment of the invention, conversational commerce eliminates the friction of e-commerce, from product discovery through checkout, by enabling the user to complete the entire shopping experience using natural language in the form of written text or speech via a conversational user interface (CUI) and bypass the web-based experience on their mobile phone. The CUI allows the user to search for products and select them using written or spoken natural language through either text or voice interface on their mobile device as they would if they communicated with a human. The details of the order, such as product specifications and pricing, are communicated back to the user using text or speech on their mobile device. The user can then simply reply with "yes" (or other affirmative language) to place the order. If the payment information is already in the system, which needs to be entered only once, the order placement process is completed purely by communicating such affirmative confirmation using natural language without ever having to click through a web interface and fill out any web forms. This significantly reduces friction during the shopping experience on mobile devices and drives higher conversions, more transactions, and increases sales. Thus, the end user is able to purchase goods or services using written or spoken natural language via the conversational commerce system.

In further illustration, FIG. 1 schematically shows a data processing system configured for online ordering using conversational interface. In an embodiment of the invention, the conversational commerce system enrolls a user in two ways: (i) via e-commerce website where user can enter their mobile number, or (ii) by sending a specific alphanumeric code, word, or a sentence via the conversational user interface (CUI), such as the SMS text messaging service, to a designated phone number. In both cases, the system then sends a message containing Terms & Conditions of service of a brand/company and a request to agree to receive text messages from such brand/company in compliance with FCC regulations. After the user agrees to those terms by replying with an affirmative response, the user can initiate the shopping process with such brand/company by using text or speech to request orders for products/services or a to ask a question. The system uses natural language processing (NLP) to determine the intent from the user's message. Specific intents include an intent to order specific products, an intent to inquire about product details, an intent to ask for product recommendations, just to name a few. If the intent is to order specific products, the user will receive an order summary with the product details and pricing of the requested product/service. After the user sends an affirmative message in response to the order summary, the order is processed and the user is charged for the purchase and receives a message containing the order receipt. In the case of the first-time purchase, the user receives a text response with a secure web link to enter they payment information, personal information and delivery address prior to processing the order. The payment information is received and processed by the Payment Gateway. Simultaneously, an account is created for the user in the database. At any time following the initial purchase, after the payment information is stored in the system, the user only needs to send a message with an order request and then reply with an affirmative response to the received order summary, after which the item will be ordered and the purchase completed.

Additionally, the proposed system allows requesting orders using an image of a product. The image is processed by an image processing and classification algorithm or is reviewed by a human to be able to create the order. After this step, the order summary is sent to the user and the order process continues as before.

Additionally, using the proposed system, the brand/company can send the user outbound texts with pertinent information related to marketing, product promotions, and shipping updates, among others. Such examples include product recommendations, promotions, product announcements, services of interest, informational updates, repeat order reminders, brand building, and shipping updates, among other such Outbound Marketing Messages.

Additionally, the system uses personal user profiles built from various data such as demographic, order history, preferences, history of conversations, and other data sources. Based on the profile, the system can build customized outbound messaging such as personalized product or service recommendations based on the purchasing habits of similar users. For example, if user A purchases a particular pair of shoes and socks together, and user B recently purchased the same shoes. The Provider may reach out to user B to recommend the socks purchased by User A (or similar products) or promotions related as such.

Additionally, the system can automatically process orders by placing and fulfilling orders directly with the retailer without human intervention. Order information is sent to the retailer software through application programming interface (API) together with the payment information and is received and processed within the retailer system to fulfill orders all the way to delivery.

FIG. 1 shows computing architectures in accordance with embodiments of the present disclosure. In FIG. 1, an exemplary conversational commerce system is disclosed. To register, the user may either use a web browser or a mobile device. After the registration, the user may use a mobile device text interface, or a built-in speech to text software to create a message using natural language. In the proposed system, the message is transmitted and received by an external messaging service (SMS Gateway) and then queued for processing. The Natural Language Understanding (NLU) module processes each individual user message to extract relevant data, such as user intent and product information, using various language technology techniques such as morphological, syntactic and semantic analysis among others. The NLU module can automatically extract order information from the message and send it to Order Manager module to create, modify and submit orders and store the order information in the System Database. The user may also send a picture of the product they want to purchase. The product image classifier is a trained Artificial Intelligence model that is capable of extracting product information from the image and sending this information to the Order manager for further processing. The Order Manager can also send payment and order information to a remote software component operated by a retailer to process and fulfill orders automatically. The NLU module is also able to instruct the Dialog Manager on how to continue a conversation with the user to address the subsequent user requests, such as order modifications, requesting order information, or starting a new order. Dialog manager is responsible for understanding the context of the entire conversation and governing the process of communicating to the user. The Natural Language Generation (NLG) model maps the dialog act generated by the dialog policy to a natural language utterance that can be transmitted to the user as a response message. Extracting and managing orders for a brand/retailer/company is made possible by using the System Product Knowledge Database that maintains information about products available for purchase, including the product taxonomy and relationships between products. More complex intents such as requests for customer support may be handled by a human agent through an interface provided by Switchboard software component. Human agents are able to monitor conversations, access and modify all product and user data, customize messaging and directly reply to users as required.

The System Product Knowledge Database contains all products that are available for sale and all product taxonomy and relationships. For example, the System Product Knowledge Database includes information on product categories, attributes and values of those attributes. As well, the System Product Knowledge Database is organized as a graph that connects products based on their use, relationship to other products, and based on their attributes, attribute values, and categories. This allows the System Product Knowledge Database to have relationships between products to determine whether a product "is a part of" or "has the same use as", or "is a member of the same category" as other products. The System Product Knowledge Database may be stored as a knowledge graph. This knowledge graph is a probabilistic graph, meaning that the relationships between products have a degree of probability assigned so the graph knows to what certainty we can relate two products. Recommendations for products may use this relationship as stored in the knowledge graph.

The image classification algorithms may use convolutional neural networks. Using convolutional neural networks, given a catalog or set of products, this module can take in any image that represents any product from this set, showing the product at any angle or representation and is able to accurately classify which product it is straight from the image.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are pos- sible without departing from the scope of the invention defined in the appended claims as follows:

What is claimed is:

1. A method for online ordering, the method comprising:
storing customer information corresponding to a customer; and
responsive to receiving a message with text or speech and an image from the customer:
performing, by a data processing system comprising a hardware processor, a natural language understanding operation on the received message to identify an intent type associated with the received message;
performing, by the data processing system, an image classification operation on the image to identify a product or service from the image;
generating, by the data processing system, a product detail message by performing a natural language generation operation on information associated with the product or service and transmitting the product detail message to the customer, the product detail message comprising at least pricing associated with the product or service; and
responsive to performing a second natural language understanding operation on a message received from the customer in response to the product detail message and determining that the message comprises an affirmative message, automatically completing, by the data processing system, a purchase of the product or service with the customer information and transmitting a receipt message to the customer with an order receipt.

2. The method according to claim 1, wherein the message is received through text message.

3. The method according to claim 1, wherein the customer information includes a phone number, payment information and shipping information.

4. The method according to claim 1, wherein the intent type of the received message identified by the natural language understanding operation includes an intent to order specific products, an intent to inquire about product details, and an intent to ask for product recommendations, and wherein the product detail message generated using the natural language generation operation corresponds to the intent type.

5. The method according to claim 1, wherein the product detail message comprises product details that are identified using a system product knowledge database.

6. The method according to claim 5, wherein the system product knowledge database is stored as a knowledge graph.

7. A data processing system configured for online ordering comprising:
a host computing system comprising one or more computers each with memory and at least one processor;
an application executing in memory of the host computing system; and,
a module coupled to the application, the module comprising program code enabled to store customer information corresponding to a customer and to respond to receiving a message with text or speech and an image from the customer by performing a natural language understanding operation on the received message to identify an intent type associated with the received message, performing an image classification operation on the image to identify a product or service from the image, generating a product detail message by performing a natural language generation operation on information associated with the product or service and transmitting the product detail message to the customer, the product detail message comprising at least pricing associated with the product or service, and performing a second natural language understanding operation on a message received from the customer in response to the product detail message and determining that the message comprises an affirmative message, automatically completing a purchase of the product or service with the customer information and transmitting a receipt message to the customer with an order receipt.

8. The system of claim 7, wherein the message is received through text message.

9. The system of claim 7, wherein the customer information includes a phone number, payment information and shipping information.

10. The system of claim 7, wherein the intent type of the received message identified by the natural language understanding operation includes an intent to order specific products, an intent to inquire about product details, and an intent to ask for product recommendations, and wherein the product detail message generated using the natural language generation operation corresponds to the intent type.

11. The system of claim 7, wherein the product detail message comprises product details that are identified using a system product knowledge database.

12. The system of claim 11, wherein the system product knowledge database is stored as a knowledge graph.

13. A computer program product for online ordering, the computer program product including a non-transitory computer readable storage medium having program instructions embodied therewith, the program instructions executable by a device to cause the device to perform a method including:
storing customer information storing customer information corresponding to a customer; and
responsive to receiving a message with text or speech and an image from the customer:
performing a natural language understanding operation on the received message to identify an intent type associated with the received message;
performing an image classification operation on the image to identify a product or service from the image;
generating a product detail message by performing a natural language generation operation on information associated with the product or service and transmitting the product detail message to the customer, the product detail message comprising at least pricing associated with the product or service; and
responsive to performing a second natural language understanding operation on a message received from the customer in response to the product detail message and determining that the message comprises an affirmative message, automatically completing a purchase of the product or service with the customer information and transmitting a receipt message to the customer with an order receipt.

14. The computer program product of claim 13, wherein the message is received through text message.

15. The computer program product of claim 13, wherein the customer information includes a phone number, payment information and shipping information.

16. The computer program product of claim 13, wherein the intent type of the received message identified by the natural language understanding operation includes an intent to order specific products, an intent to inquire about product details, and an intent to ask for product recommendations, and wherein the product detail message generated using the natural language generation operation corresponds to the intent type.

17. The computer program product of claim 13, wherein the product detail message comprises product details that are identified using a system product knowledge database.

18. The computer program product of claim 17 wherein the system product knowledge database is stored as a knowledge graph.

* * * * *